United States Patent
Matsumura

(10) Patent No.: US 10,289,787 B2
(45) Date of Patent: May 14, 2019

(54) CONTROL PROGRAM AND CONTROL METHOD FOR PROGRAMMABLE LOGIC DEVICE AND INFORMATION PROCESSING APPARATUS INCLUDING THE SAME

(71) Applicant: FUJITSU LIMITED, Kawasaki-shi, Kanagawa (JP)

(72) Inventor: Hidetoshi Matsumura, Cupertino, CA (US)

(73) Assignee: FUJITSU LIMITED, Kawasaki (JP)

( * ) Notice: Subject to any disclaimer, the term of this patent is extended or adjusted under 35 U.S.C. 154(b) by 9 days.

(21) Appl. No.: 15/647,858

(22) Filed: Jul. 12, 2017

(65) Prior Publication Data

US 2018/0032657 A1 Feb. 1, 2018

(30) Foreign Application Priority Data

Jul. 26, 2016 (JP) .................................. 2016-146197

(51) Int. Cl.

| | |
|---|---|
| *G06F 17/50* | (2006.01) |
| *G06F 15/80* | (2006.01) |
| *G06F 21/34* | (2013.01) |
| *G06F 15/78* | (2006.01) |
| *G06F 21/57* | (2013.01) |
| *G06F 21/76* | (2013.01) |
| *H04L 9/14* | (2006.01) |
| *H04L 9/32* | (2006.01) |

(52) U.S. Cl.
CPC ...... *G06F 17/5054* (2013.01); *G06F 15/7867* (2013.01); *G06F 15/7871* (2013.01); *G06F 15/8007* (2013.01); *G06F 21/34* (2013.01); *G06F 21/57* (2013.01); *G06F 21/76* (2013.01); *H04L 9/14* (2013.01); *H04L 9/32* (2013.01)

(58) Field of Classification Search
None
See application file for complete search history.

(56) References Cited

U.S. PATENT DOCUMENTS

| | | | |
|---|---|---|---|
| 6,603,481 B1 * | 8/2003 | Kawai ................. | G06F 15/8007 345/505 |
| 9,754,061 B2 * | 9/2017 | Sentieys ............. | G06F 17/5054 |

(Continued)

FOREIGN PATENT DOCUMENTS

| | | |
|---|---|---|
| JP | H11-184718 | 7/1999 |
| JP | 2004-021426 | 1/2004 |

(Continued)

*Primary Examiner* — Crystal L Hammond
(74) *Attorney, Agent, or Firm* — Fujitsu Patent Center

(57) ABSTRACT

A PLD control program causes a computer to execute process including: outputting a configuration request for configuring a logic circuit in any of a plurality of areas where logic circuits are enabled to be reconfigured in a programmable logic device (hereinafter referred to as a PLD); and selecting, when a total size or number of a plurality of first logic circuits already configured in the plurality of areas and a second logic circuit newly configured in accordance with the configuration request exceeds a size or a number of logic circuits that are enabled to be configured in the plurality of areas, a logic circuit to be replaced with the second logic circuit, as a replacement target, from among the plurality of first logic circuits, based on a save and restore time needed to save and restore state data in the first logic circuits.

13 Claims, 15 Drawing Sheets

(56) References Cited

U.S. PATENT DOCUMENTS

2009/0319754 A1 12/2009 Toi et al.
2015/0134937 A1* 5/2015 Rubinstein .......... G06F 9/30032
                                                712/225
2016/0342722 A1* 11/2016 Sentieys ............. G06F 15/7871

FOREIGN PATENT DOCUMENTS

| JP | 2006-333496 | 12/2006 |
| JP | 2010-002986 | 1/2010 |

* cited by examiner

FIG. 9

| LOGIC CIRCUIT ID | CONFIGURATION INFORMATION CDATA | S/R TIME |
|---|---|---|
| A | CDATA_A | 3 |
| B | CDATA_B | 4 |
| C | CDATA_C | 1 |
| D | CDATA_D | 1 |
| E | CDATA_E | 1 |

FIG. 10

| LOGIC CIRCUIT ID | STATE_NO | S/R TIME |
|---|---|---|
| A | ST0 | 1 |
|   | ST1 | 3 |
|   | ST2 | 4 |
|   | ST3 | 2 |
|   | ST4 | 1 |
| B | ST0 | 1 |
|   | ST1 | 4 |
|   | ST2 | 2 |

FIG. 14

PRR MANAGING TABLE

| PRR ID | LOGIC CIRCUIT ID | NONUSE TIME |
|---|---|---|
| 0 | — | 1 |
| 1 | A | 2 |
| 2 | B | 2 |
| 3 | C | 1 |

FIG. 15    REPLACEMENT TARGET PRR SELECTION ALGORITHM

| PRR ID | LOGIC CIRCUIT ID | NONUSE TIME (LRU) | S/R TIME | EVALUA- TION VALUE E | REPLACEMENT TARGET PRR ||||
|---|---|---|---|---|---|---|---|---|
| | | | | | NONUSE TIME (LRU) | SHORTEST S/R TIME | LRU + S/R TIME | LARGEST EVALUATI- ON VALUE |
| 0 | — | — | — | — | | | | |
| 1 | A | 2 | 3 | -1 | ✓ | | ✓ | |
| 2 | B | 2 | 4 | -2 | ✓ | | | |
| 3 | C | 1 | 1 | 0 | | ✓ | | ✓ |

E = NONUSE TIME - w × S/R TIME

CONTROL PROGRAM AND CONTROL METHOD FOR PROGRAMMABLE LOGIC DEVICE AND INFORMATION PROCESSING APPARATUS INCLUDING THE SAME

CROSS-REFERENCE TO RELATED APPLICATION

This application is based upon and claims the benefit of priority of the prior Japanese Patent Application No. 2016-146197, filed on Jul. 26, 2016, the entire contents of which are incorporated herein by reference.

FIELD

The present invention relates to a control program and a control method for a programmable logic device and an information processing apparatus including the same.

BACKGROUND

A programmable logic device (PLD) reconfigures a circuit that can execute a predetermined process when configuration data for configuring the circuit that can execute the predetermined process is set in or written to an integrated circuit device in which a plurality of logic circuit elements, memory circuit elements, interconnects, switches, and the like are formed. A control circuit including processors and connected to a PLD sets or writes the configuration data for configuring a dedicated circuit in or to the PLD to configure the dedicated circuit in the PLD, to cause the dedicated circuit to execute a predetermined process. Such a PLD is an LSI, for example, a field programmable gate array (FPGA), which can reconfigure internal circuits into various logic circuits by rewriting configuration data.

When executing a process for a task, the control circuit configures, in the PLD, a logic circuit that executes a process for the task. When executing a process for a different task after the process for the task ends, the control circuit reconfigures, in the PLD, a logic circuit that executes a process for the different task. The PLD can be reconfigured into a plurality of logic circuits that execute processes for the respective tasks. The PLD is thus flexible about executable processes like software and can execute processes for a plurality of tasks at high speed using the dedicated logic circuit.

The PLD is disclosed in Japanese Laid-open Patent Publication No. 2010-2986, Japanese Laid-open Patent Publication No. 2006-333496, Japanese Laid-open Patent Publication No. 2004-21426, and Japanese Laid-open Patent Publication No. H11-184718.

SUMMARY

A PLD has been proposed in which configuration data for a first logic circuit is set in a first area that is a part of a programmable logic circuit group to configure the first logic circuit and configuration data for a second logic circuit is set in a second area, different from the first area, to configure the second logic circuit, and moreover the first and second logic circuits are configured, executed and changed independent of each other.

Thus, information processing apparatuses provided with a mixture of processors and a PLD are predicted to provide general-purpose calculating capabilities like an ordinary server. In that case, in order to allow a single CPU to execute a plurality of tasks in a time sharing manner, a plurality of logic circuits processing the respective tasks are asynchronously configured and operate asynchronously in a single PLD. When a plurality of logic circuits are asynchronously configured and operate asynchronously, if the number of logic circuits for all the tasks exceeds circuit resources in the programmable logic circuit group in the PLD, the tasks are processed in a time sharing manner with any of the logic circuits in the PLD changed as needed.

One of the present embodiment is a non-transitory computer-readable storage medium that stores therein a PLD control program for causing a computer to execute process comprising: outputting a configuration request for configuring a logic circuit in any of a plurality of areas where logic circuits are enabled to be reconfigured in a programmable logic device (hereinafter referred to as a PLD); and selecting, when a total size or number of a plurality of first logic circuits already configured in the plurality of areas and a second logic circuit newly configured in accordance with the configuration request exceeds a size or a number of logic circuits that are enabled to be configured in the plurality of areas, a logic circuit to be replaced with the second logic circuit, as a replacement target, from among the plurality of first logic circuits, based on a save and restore time needed to save and restore state data in the first logic circuits.

According to a first aspect, a process for changing logic circuits configured in a PLD can be efficiently executed.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a diagram illustrating an example of logic circuits and the save and restore time (S/R time) in a case where the fixed save and restore time is preset for each logic circuit.

FIG. 10 is a diagram illustrating an example of a state FF value-time information conversion table.

FIG. 14 is a diagram illustrating an example of a PRR managing table managed by the CPU.

FIG. 15 is a table illustrating a specific example of the first to third replacement processes for the logic circuit.

DESCRIPTION OF EMBODIMENTS

[Configuration and Operation of an Information Processing Apparatus Having a PLD]

Figure 1:
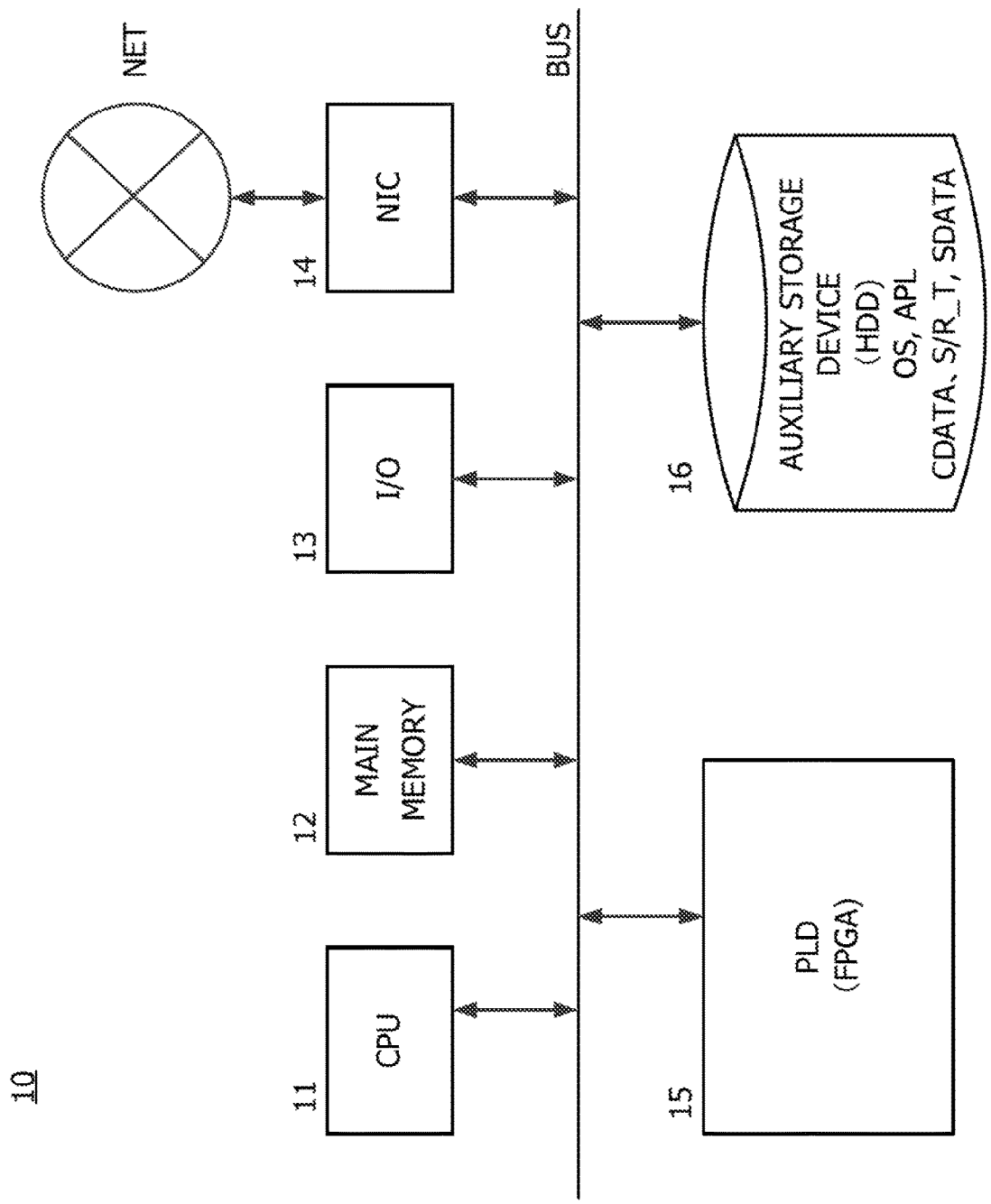
FIG. 1 is a diagram illustrating a configuration of an information processing apparatus having a PLD in the present embodiment.

FIG. 1 is a diagram illustrating a configuration of an information processing apparatus having a PLD in the present embodiment. An information processing apparatus 10 is, for example, a computer such as a server, and has a central processing unit (CPU) 11, a main memory 12 such as a DRAM, an input/output unit 13 connected to a keyboard and display apparatus, a network interface card (NIC) 14 connected a network NET, a PLD 15 such as an FPGA, and an auxiliary storage device 16 such as an HDD or an SSD. The CPU 11, the main memory 12, the input/output unit 13, the NIC 14, the PLD 15, and the auxiliary storage device 16 are connected together via a bus BUS.

In the auxiliary storage device 16, an operating system (OS), an application program APL, and a middleware program not depicted in the drawings are stored. The OS, the application program APL, and the middleware program are expanded into the main memory 12 and executed by the CPU. In the auxiliary storage device 16, the following are also stored: a list of configuration data CDATA for configuring logic circuits in the PLD, save and restore time S/R_T needed to save and restore state data in the logic circuits, and save data SDATA from any of the logic circuits that is temporarily deleted from the PLD. The data CDATA, S/R_T, and SDATA are also stored in the main memory 12 and referenced by the CPU while the computer is in operation.

When the CPU sets or writes, in or to the PLD, the configuration data CDATA for a predetermined logic circuit that executes a predetermined process in order to configure the logic circuit, the logic circuit is configured in the PLD. Then, the logic circuit executes the predetermined process.

Figure 2:
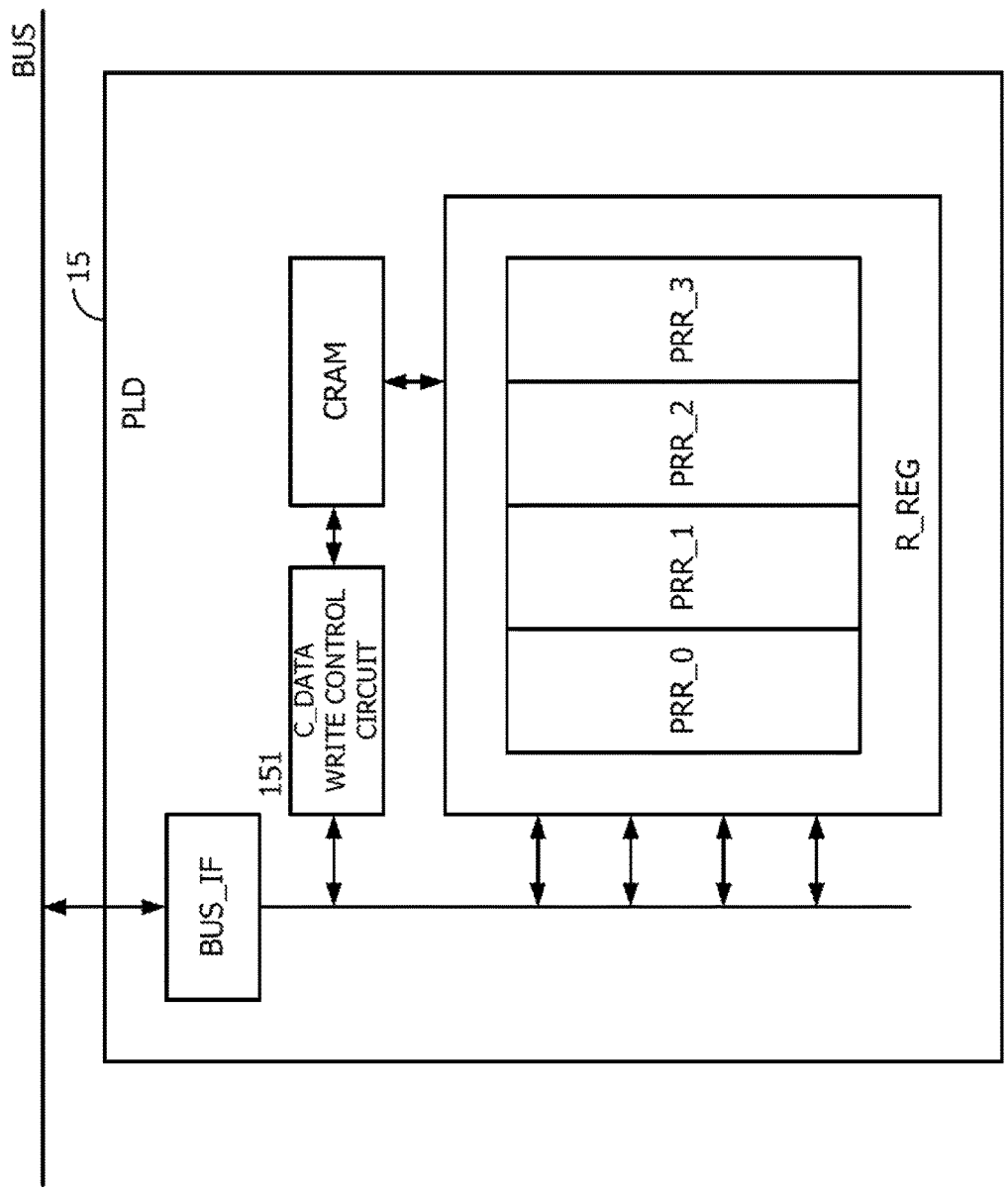
FIG. 2 is a diagram illustrating a general configuration of the PLD in the present embodiment.

FIG. 2 is a diagram illustrating a configuration of the PLD in the present embodiment. The PLD 15 has a bus interface circuit BUS_IF that interfaces with the bus BUS in the computer, a configuration data write control circuit 151, a configuration data memory CRAM to which configuration data is written, and a reconfiguration area R_REG in which various logic circuits are reconfigured according the written configuration data.

In the reconfiguration area R_REG, a plurality of logic circuit elements, memory circuit elements, interconnects, switches, and the like are formed although not depicted in the drawings. The reconfiguration area R_REG is logically or physically segmented into a plurality of partial reconfiguration areas PRR. A logic circuit for reconfiguration is configured in partial reconfiguration areas using, as a configurational unit, circuit blocks that can be housed in each partial reconfiguration area. Therefore, for example, the configuration data memory CRAM is segmented into a plurality of storage areas corresponding to the plurality of partial reconfiguration areas PRR. When the configuration data CDATA is written to a storage area, a logic circuit are configured in the partial reconfiguration area corresponding to the storage area.

When a logic circuit that processes a certain task is divisionally configured in a plurality of partial reconfiguration areas, configuration data for logic circuits resulting from the division are written to the storage areas corresponding to the plurality of partial reconfiguration areas. The resultant plurality of logic circuits executes the process for the above-described task.

A specific example of the plurality of partial reconfiguration areas PRR in the reconfiguration area R_REG will be described below.

Figure 3:
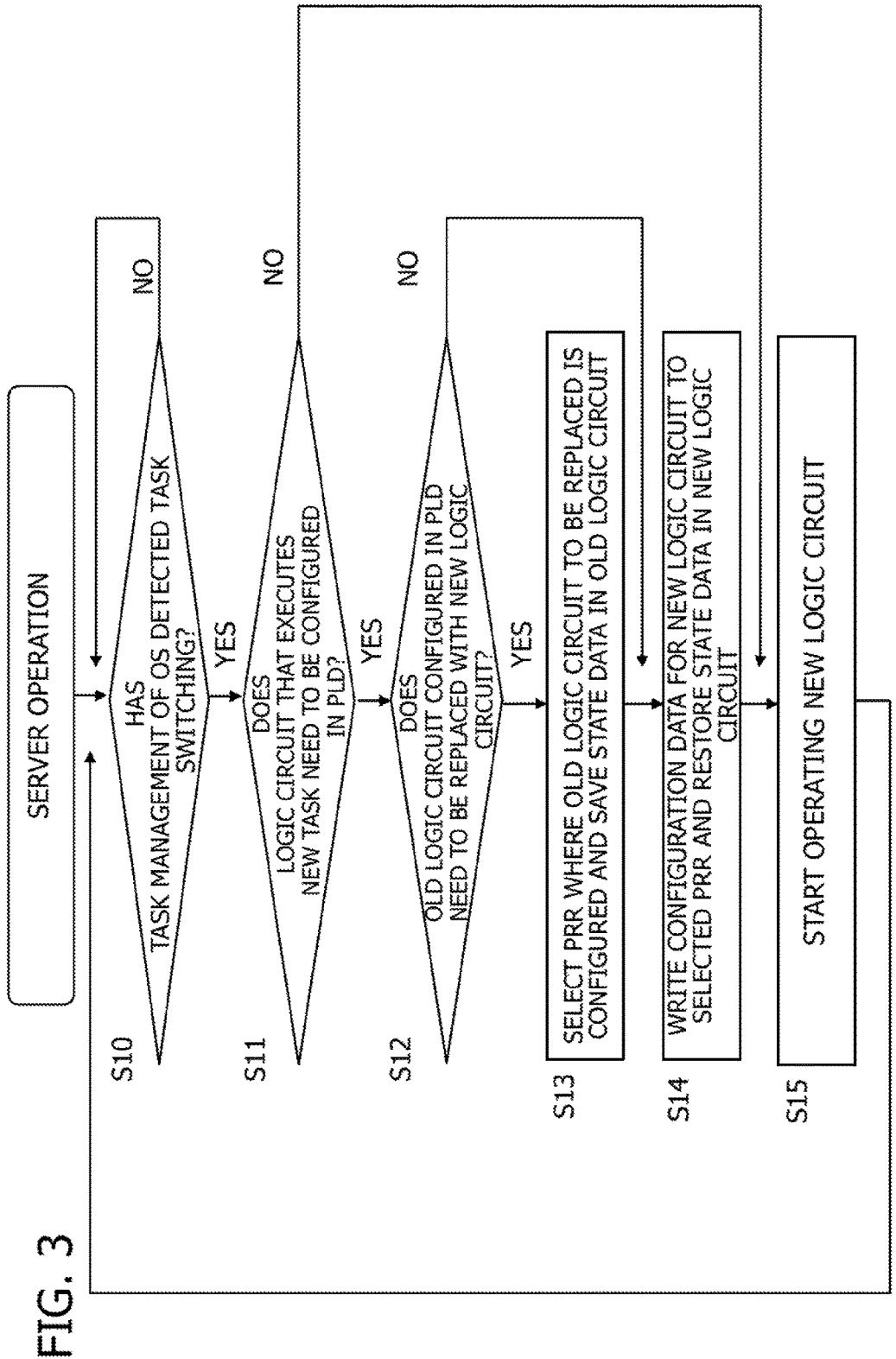
FIG. 3 is a flowchart generally illustrating operations of a server that is an information processing apparatus having the PLD in the present embodiment.

FIG. 3 is a flowchart generally illustrating operations of a server that is an information processing apparatus having the PLD in the present embodiment. By way of example, upon detecting switching from a certain task to a new task, a task managing module of the OS executed by the CPU configures a logic circuit that processes the new task, in the PLD as needed. For simplification, all the tasks are assumed to be processed by the logic circuits in the PLD. However, in response to another event, the CPU may configure a new logic circuit in the PLD. Moreover, part of the tasks may be processed by the logic circuits in the PLD.

First, the task managing module of the OS executed by the CPU detects switching from a certain task to a new task (S10, YES). The CPU executes the task managing module to determine whether or not logic circuit that executes the new task needs to be configured in the PLD (S11). In other words, when the logic circuit for the new task is already configured in the PLD and is inactive, no new logic circuit needs to be configured in the PLD. However, when no logic circuit for the new task is configured in the PLD or the logic circuit is already configured but is active, a new logic circuit needs to be configured in the PLD.

When a new logic circuit needs to be configured in the PLD (S11, YES), the CPU executes the task managing module to determine whether or not any of the logic circuits configured in the PLD needs to be replaced with the logic circuit for the new task (S12). In other words, in the reconfiguration area R_REG in the PLD, each logic circuit is configured in the units of circuit blocks that can be housed in the plurality of partial reconfiguration areas PRR as described above. Therefore, when logic circuits are already configured in all of the plurality of partial reconfiguration areas PRR, any of the configured logic circuits needs to be replaced with the new logic circuit. In other words, when the total number of partial reconfiguration areas is exceeded by the number of partial reconfiguration areas in which logic circuits are already configured and the number of partial reconfiguration areas in which the logic circuit to be newly configured is configured, any of the old logic circuits in the filled partial reconfiguration areas PRR needs to be replaced with the new logic circuit.

This means that, when the total size of the configured logic circuit and the new logic circuit exceeds the size of a logic circuit that can be configured in all of the plurality of partial reconfiguration areas, the configured logic circuit in any of the partial reconfiguration areas needs to be replaced with the new logic circuit. The plurality of partial reconfiguration areas preferably have a uniform circuit size, but when the partial reconfiguration areas have different circuit sizes, whether or not replacement is needed is determined based on the circuit size of the new logic circuit instead of the number of partial reconfiguration areas.

Thus, when the replacement is needed (S12, YES), the CPU executes the task managing module to selects a partial reconfiguration area forming the configured logic circuit (old logic circuit) to be replaced. State data in the old logic circuit to be replaced is saved to the main memory 12 (S13).

After the state data in the old logic circuit is saved (S13), the CPU writes the configuration data for the logic circuit for the new task to an area in the configuration data memory CRAM corresponding to the selected partial reconfiguration areas. The CPU then configures the new logic circuit for the new task in the partial reconfiguration areas in which the old logic circuit to be replaced has been configured (S14). When a sufficient free partial reconfiguration area is present in the PLD (S12, NO), the CPU writes the configuration data in the configuration data memory to configure the new logic circuit in the free partial reconfiguration area (S14).

Then, when the new logic circuit resumes operating, the state data saved at the time of the last deactivation is restored in the new logic circuit (S14). When the new logic circuit does not resume operating, initial values are set for new logic circuit based on the configuration data.

When the operation of the new logic circuit is ready to be resumed or a new operation is ready to start, the CPU starts the operation by the new logic circuit (S15). Specifically, the CPU instructs a state control circuit in the new logic circuit to start operating. When the logic circuit for the new task is already configured in the PLD and is inactive when detecting the switching of the task (S11, NO), the CPU also starts the operating by the new logic circuit (S15).

Repeating the steps S10 to S15 described above the plurality of logic circuits are asynchronously configured in the PLD and operate asynchronously as is the case with time sharing execution of a plurality of tasks by the CPU. Since the number of reconfigurable areas in the PLD is limited, when the total number of configured old logic circuits and a newly configured logic circuit exceeds the total number of logic circuits that can be configured in the PLD (in other words, the total number of partial reconfiguration areas PRR), the CPU causes the logic circuit for the needed task to operate, which replacing any of the logic circuits in the partial reconfiguration areas in the PLD. When any of the logic circuits configured in the PLD stops or suspends operation, while no logic circuit needs to be replaced in order to configure the new logic circuit, the configured logic circuit is maintained in the PLD, and a saving process for the state data in the circuit is not executed.

As described above, when the PLD asynchronously configures and operates a plurality of logic circuits, if the reconfiguration area in the PLD is full of configured logic circuits, any of the configured logic circuits in the reconfiguration area needs to be replaced with the new logic circuit in order to configure a new logic circuit. Such control is similar to a replacement control for cache blocks in a cache memory. However, the replacement process for logic circuits in the PLD is similar to the cache memory in rewriting the configuration data for the logic circuits, but is different from the cache memory in saving the state data in the old logic circuit and restoring the state data in the new logic circuit.

[Plurality of Partial Reconfiguration Areas in the PLD]

Figure 4:
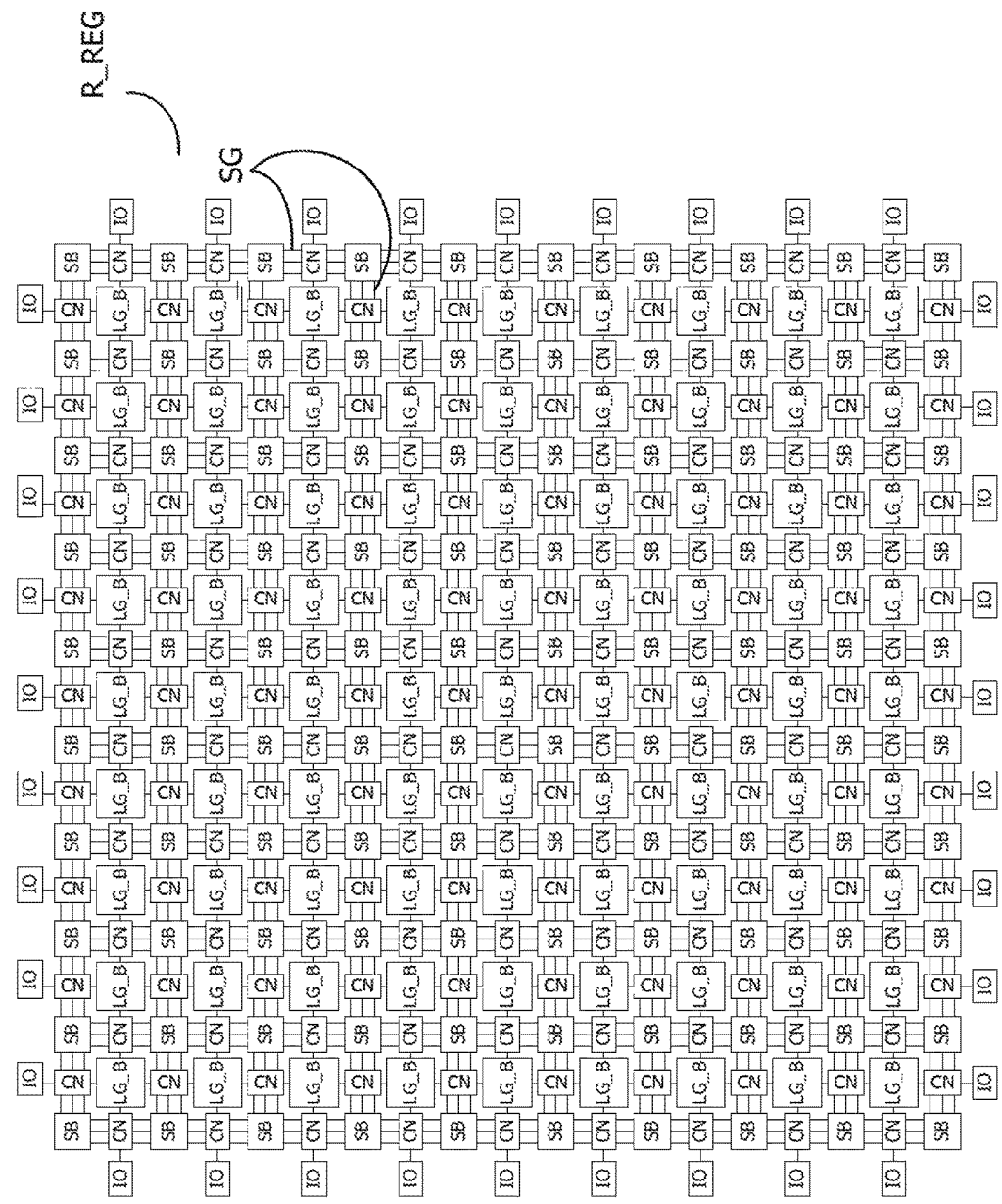
FIG. 4 is a diagram illustrating a configuration example of the reconfiguration area R_REG in the PLD.

FIG. 4 is a diagram illustrating a configuration example of the reconfiguration area R_REG in the PLD. The reconfiguration area R_REG has logic circuit blocks LG_B arranged in a matrix and reconfigured into predetermined logic circuits using configuration data and signal line groups SG arranged around the logic circuit blocks LG_B in a vertical direction and a horizontal direction. The reconfiguration area R_REG further has switch boxes SB provided at positions where the vertical signal line groups SG and the horizontal signal line groups SG intersect and having a plurality of switches to be conductive or non-conductive based on configuration data, and connections CN having a plurality of switches each provided between the corresponding signal lines in the corresponding signal line group SG and input/output terminals of the corresponding logic circuit blocks LG_B. The switches of the connections CN are also set to be electrically conductive or non-conductive based on configuration data.

Moreover, a plurality of input/output circuits IO connected to the bus interface BUS_IF in the PLD are arranged around the reconfiguration area R_REG and also connected to the signals in the signal line groups SG via the switches in the connections CN. Memory blocks forming, for example, a SRAM may be arranged in some of the logic circuit blocks LG_B.

Logic circuit blocks LG_B are reconfigured into certain logic circuits based on configuration data, and the switches in relevant switch boxes SB and connections CN are reconfigured into certain interconnects. As a result, the certain logic circuits are reconfigured.

Figure 5:
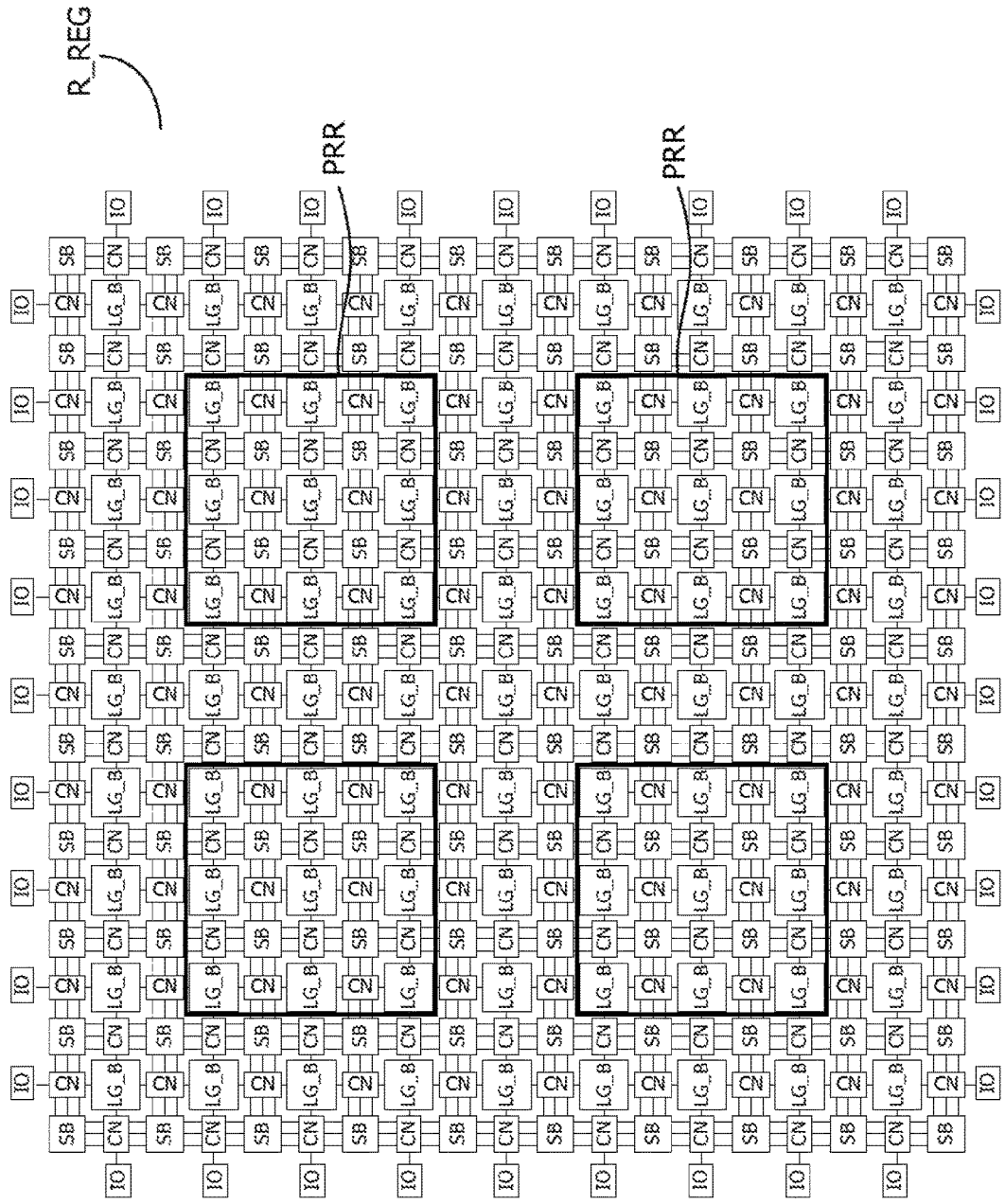
FIG. 5 is a diagram illustrating an example of the partial reconfiguration areas PRR logically arranged in the reconfiguration area R_REG in the PLD.

FIG. 5 is a diagram illustrating an example of the partial reconfiguration areas PRR logically arranged in the reconfiguration area R_REG in the PLD. By way of example, in FIG. 5, four partial reconfiguration areas PRR are arranged in the reconfiguration area R_REG. The areas other than the four partial reconfiguration areas PRR are utilized as common circuit areas.

As depicted in FIG. 4, in the reconfiguration area R_REG, the logic circuit blocks LG_B, the signal line groups SG, the switch boxes SB, and the connections CN are continuously and flatly arranged. Therefore, the reconfiguration area R_REG in FIG. 4 has no physical configuration that distinguishes a plurality of partial reconfiguration areas PRR from one another.

On the other hand, in the PLD in FIG. 5, for example the logic circuit blocks (or memory blocks) LG_B in three rows and three columns in the reconfiguration area R_REG, that is, a total of nine logic circuit blocks LG_B, are logically set as a partial reconfiguration area PRR.

For example, upon receiving, from the CPU, a write request for configuration data for a logic circuit corresponding to a certain task, the configuration data write control circuit 151 depicted in FIG. 2 writes the received data to a storage area in the configuration data memory CRAM corresponding to a partial reconfiguration area in which no logic circuit has been configured. As a result, the corresponding logic circuit is configured based on the written configuration data in the partial reconfiguration area. Therefore, in response to the write request, the configuration data write control circuit 151 selects a partial reconfiguration area PRR with no logic circuit configured therein from the plurality of partial reconfiguration areas PRR into which the reconfiguration area R_REG is logically segmented. The configuration data write control circuit 151 then writes the received configuration data to the storage area corresponding to the selected partial reconfiguration area.

Of course, although not depicted in the drawings, the reconfiguration area R_REG may be provided with a physical configuration that distinguishes the plurality of partial reconfiguration areas PRR from one another. In that case, the PLD has a plurality of partial reconfiguration areas PRR each having a fixed size and located at a fixed position.

[Example of a Saving and Restoration Circuit for the Logical Circuit to be Reconfigured]

Figure 6:
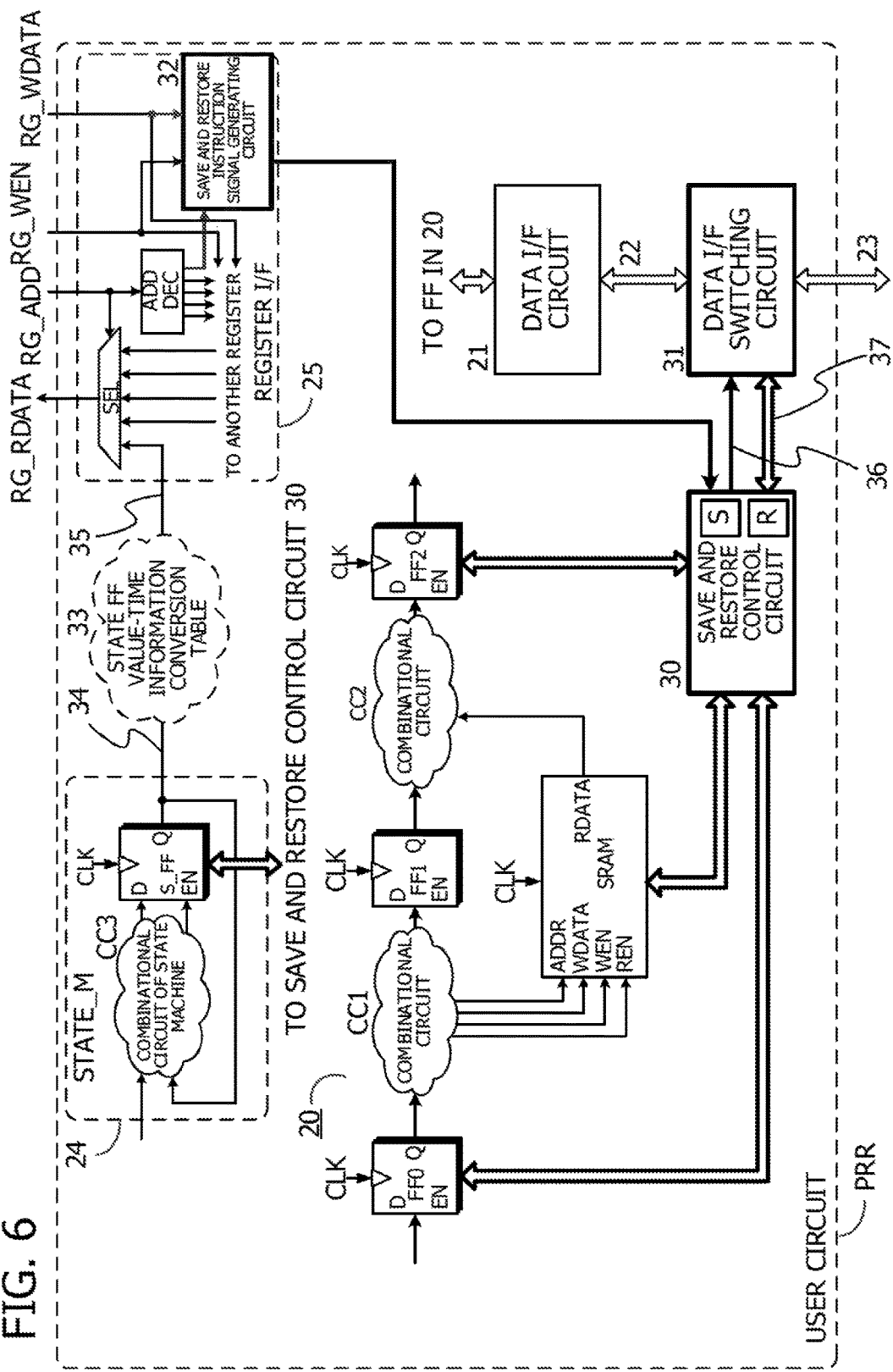
FIG. 6 is a diagram illustrating an example of a user circuit (logic circuit) in the partial reconfiguration area in the present embodiment.

FIG. 6 is a diagram illustrating an example of a user circuit (logic circuit) in the partial reconfiguration area in the present embodiment. As described for FIG. 3, a plurality of logic circuits are asynchronously configured and operates asynchronously in the reconfiguration area R_REG in the PLD. Thus, various logic circuits are configured in the plurality of partial reconfiguration areas PRR in the reconfiguration area R_REG while being replaced with one another. In a replacement process for the logic circuit, the state data in the old logic circuit to be replaced is saved to the main memory, the configuration data for the new logic circuit is written, and the state data in the new logic circuit is restored when the new logic circuit resumes operation. Thus, the user circuit includes a circuit configuration that enables the state data to be saved and restored.

In FIG. 6, the following are configured in the partial reconfiguration area PRR: a logic circuit 20 that processes a task, a state machine circuit 24 that controls the state of the logic circuit 20, a data interface circuit 21 that is an interface between the data in the logic circuit and data at the outside, and a register interface circuit 25 that is an interface between the exterior and registers in the logic circuit 20 and the state machine circuit 24.

The logic circuit 20 has a plurality of combinational circuits CC1, CC2, latch circuits FF0, FF1, FF2 such as flip flops which are arranged before and after and between the combinational circuits, and a memory circuit SRAM such as a SRAM. In the example in FIG. 6, the combinational circuit CC1 inputs an address ADDR, write data WDATA, a write enable signal WEN, and a read enable signal REN to the memory circuit SRAM. The memory circuit operates synchronously with an internal clock CLK, and output read data RDATA to the combinational circuit CC2.

On the other hand, the state machine circuit 24 has a combinational circuit CC3 of state machines, and a state flip flop S_FF that latches an output from the combinational circuit CC3 to input latched data to the combinational circuit CC3 again. The latch circuit and the state flip flop perform latch operations in synchronism with the internal clock CLK.

The register interface circuit 25 has a selector SEL that selects one of the outputs of internal registers to output data in a register to the exterior, and an address decoder ADD_DEC that decodes an externally received register address RG_ADD to supply a select signal to the internal register. The register interface circuit 25 input the register address RG_ADD, register write enable RG_WEN, and register write data RG_WDATA from the exterior and output register read data RG_RDATA. Consequently, data can be set in the internal register from exterior and the data in the internal register can be output to the exterior.

[Saving and Restoration of the State Data in Conjunction with Replacement of the Logic Circuit]

Now, a circuit will be described which saves and restores the state data in conjunction with replacement of the logic circuit. The state data that is saved and restored in conjunction with replacement of the logic circuit is data latched in the predetermined latch circuit FF or data stored in the memory circuit SRAM. The data depends on the logic circuit and on an operating state of the logic circuit.

By way of example, in the logic circuit 20 in FIG. 6, the latch circuits FF0, FF2 and the memory circuit SRAM need data saving and restoration. In the state machine 24, the state flip flop S_FF that holds the state data needs data saving and restoration.

Thus, the user circuit includes a save and restore control circuit 30 that controls saving and restoration of the state data; a data interface switching circuit 31 that switches between a data signal line 22 of the data interface circuit 21 or a data signal line 37 of the save and restore control circuit 30 in accordance with a switching signal 36 so as to connect one of the data signal lines to an external data terminal 23; and a save and restore instruction signal generating circuit 32 that generates a save and restore instruction signal instructing the save and restore control circuit 30 to perform saving or restoration. The user circuit further includes a state data/save and restore time conversion table 33 that converts state data 34 in the state flip flop S_FF in the state machine circuit 24 into save and restore time information 35. The conversion table will be described below in detail.

Figure 7:
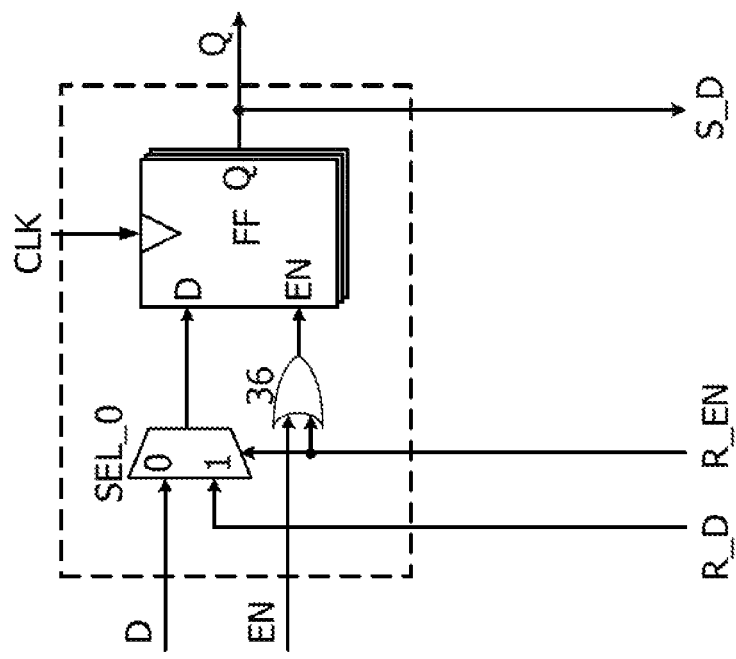
FIG. 7 is a diagram illustrating a configuration of the latch circuits FF0, FF2 and the state flip flop S_FF that need saving and restoration of the state data.

FIG. 7 is a diagram illustrating a configuration of the latch circuits FF0, FF2 and the state flip flop S_FF that need saving and restoration of the state data. An input D of the latch circuit FF receives an output from a selector SEL_0 that selects data D from the combinational circuit or restored data R_D from the save and restore control circuit. An enable terminal EN of the latch circuit FF receives an output from the OR gate 36 that outputs a logical sum of an enable signal EN from the combinational circuit and a restore enable signal R_EN from the save and restores control circuit 30. A data output Q of the latch circuit FF is output to the succeeding combinational circuit as a normal output Q and to the save and restore control circuit 30 as saved data S_D.

During saving, the data Q latched by the latch circuit FF is simply output to the save and restore control circuit 30 as the saved data S_D. During restoration, the restore enable signal R_EN is set to "1", so that the selector SEL_0 selects restored data R_D, the latch circuit FF is set to a latch enable state, and the restored data R_D is latched in the latch circuit FF.

Figure 8:
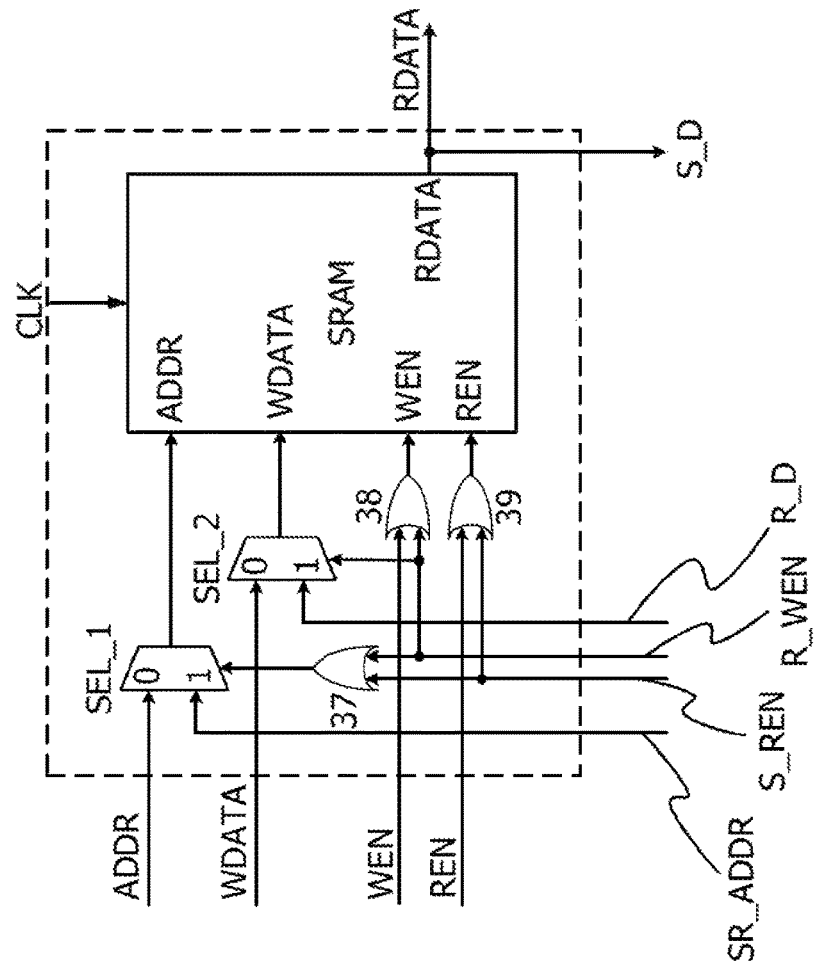
FIG. 8 is a diagram illustrating a configuration of the memory circuit SRAM that needs saving and restoration of the state data.

FIG. 8 is a diagram illustrating a configuration of the memory circuit SRAM that needs saving and restoration of the state data. The address terminal ADDR of the memory circuit SRAM receives an output from a selector SEL_1 that selects either the address ADDR from the combinational circuit or an address S/R_ADDR from the save and restore control circuit 30. A write data terminal WDATA receives an output from a selector SEL_2 that selects either the write data WDATA from the combinational circuit or the restored data R_D from the save and restore control circuit 30. The selector SEL_1 selects a save and restore address S/R_ADDR when an output from an OR gate 37 that receives a saved data read enable signal S_REN and a restored data write enable R_WEN is "1". The selector SEL_2 selects restored data R_D when the restored data write enable R_WEN is "1".

A write enable terminal WEN receives an output from an OR gate 38 that outputs the write enable signal WEN from the combinational circuit or the restored data write enable signal R_WEN from the save and restore control circuit 30. A read enable terminal REN receives an output from an OR gate 39 that outputs the read enable signal REN from the combinational circuit and the saved data read enable signal S_REN from the save and restore control circuit 30.

During saving, the saved data read enable signal S_REN is set to "1", and data corresponding to the save and restore address S/R_ADDR is output to the save and restore control circuit 30 via a saving data line S_D. Meanwhile, during restoration, the restored data write enable signal R_WEN is set to "1", and the restored data R_D is written to the save and restore address S/R_ADDR of SRAM.

Operations for saving and restoration of the state data in FIG. 6 will be described in brief. In accordance with a request from the CPU, when the PLD receives a register address RG_ADD of a saving register S in the save and restore control circuit 30, register write data RG_WDATA of "1", and a register write enable RG_WEN of "1", a save and restore instruction signal generating circuit 32 outputs a decoder output, the register write data RG_WDATA, and the register write enable RG_WEN. In response, "1" is written to the saving register S in the save and restore control circuit 30, which then starts a saving process.

In the saving process, in accordance with the above-described control signal from the save and restore control circuit 30, the state data held by the latch circuit FF and the memory circuit SRAM as save and restore targets is supplied to the save and restore control circuit 30 and output through the data terminal 23 via the data interface switching circuit 31. The saved state data is transmitted from the PLD to the main memory 12, in which the state data is stored.

Meanwhile, in a restoration process, in accordance with a request from the CPU, when the PLD receives a register address RG_ADD of a restoration register R in the save and restore control circuit 30, the register write data RG_WDATA of "1", and the register write enable RG_WEN of "1", the save and restore instruction signal generating circuit 32 outputs a decoder output, the register write data RG_WDATA, and the register write enable RG_WEN. In response, "1" is written to the restoration register R in the save and restore control circuit 30, which then starts a restoration process.

In the restoration process, in accordance with the above-described control signal from the save and restore control circuit 30, the state data to be restored transferred from the main memory is written to each of the latch circuit FF and the memory circuit SRAM as save and restore targets.

[Replacement Process (1) for the Logic Circuit]

Now, the replacement process for the logic circuit illustrated in FIG. 3 will be specifically described. The replacement process for the logic circuit includes selection of the old logic circuit as a replacement target (or selection of the partial reconfiguration area PRR in which the old logic circuit as a replacement target is configured) and the saving process for the state data in the old logic circuit (S13), and a write process of the configuration data for the new logic circuit to be newly configured and the restoration process of the state data to the new logic circuit (S14). Thus, a method for selecting the logic circuit as a replacement target in the present embodiment will be described.

As described for FIG. 3, when the CPU detects switching from a certain task to a new task, if a free partial reconfiguration area PRR large enough to configure therein the new logic circuit that executes the new task is not present in the PLD, then the CPU selects any of the plurality of partial reconfiguration areas with logic circuits configured therein, saves the state data in the configured logic circuit, writes the configuration data for the logic circuit for the new task, and restores the state data. In other words, when the total of the number or size of the old logic circuits configured in the PLD and the number or size of the new logic circuits for the new task exceeds the number or size of logic circuits that can be configured in the PLD, the CPU replaces the logic circuit selected from the plurality of configured old logic circuits with the new logic circuit.

When switching to the task corresponding to the replaced logic circuit is subsequently detected, the CPU writes the configuration data for the logic circuit into the PLD and restores the state data in the logic circuit.

The amount of state data to be saved and restored varies depending on the logic circuit configured in the partial reconfiguration area PRR. Some logic circuits involve a large amount of data to be saved and restored, and other logic circuits involve a small amount of data to be saved and restored. The amount of state data to be saved and restored may also vary depending on the operating state of the logic circuit.

Therefore, when any of the partial reconfiguration areas with logic circuits configured therein is selected as a replacement target, the replacement process for the logic circuit in the PLD is efficiently executed by selecting a partial reconfiguration area that involves as few loads as possible when the logic circuit as a replacement target is driven out of the PLD and configured again in the PLD. In other words, it is desirable that a logic circuit having relatively larger loads, which includes loads for driving the logic circuit out of the PLD and loads for driving the logic circuit back into the PLD, remains configured in the PLD and not being selected as a replacement target as much as possible, and it is desirable that a logic circuit involving a relatively few total loads is selected.

The loads for driving the logic circuit out of the PLD correspond to a time needed to save the state data in the logic circuit as described above. The loads for driving the logic circuit back into the PLD correspond to the time including a write time for the configuration data of the logic circuit and a time needed to restore the temporarily saved state data.

In the present embodiment, the CPU preferentially selects, as a replacement target, a logic circuit that involves a shorter save time and a shorter restore time for the state data in the logic circuit. Thus, upon detecting switching from a certain task to a new task, the CPU acquires save and restore time information of the logic circuits in all the partial reconfiguration areas PRR with the configuration data written thereto and preferentially selects a partial reconfiguration area PRR or a logic circuit with a shorter save and restore time as a replacement target. Specifically, a partial reconfiguration area PRR or a logic circuit with the shortest save and restore time is selected as a replacement target.

Now, acquisition of the save and restore time will be described. As described for FIG. 6, the state data in the logic circuit to be saved is known, and therefore, a save and restore circuit is added to a predetermined latch circuit FF or memory circuit SRAM being subject to saving and restoring in the user circuit. Thus, a fixed save and restore time is preset for each of the logic circuits, and the save and restore time for each logic circuit is stored in a memory that can be referenced by the CPU. In selecting the logic circuit as a replacement target, the CPU references the save and restore time for each logic circuit in the memory, and selects a logic circuit having the shortest save and restore time, as the logic circuit as a replacement target.

When the fixed save and restore time is preset for each logic circuit, the following two methods are preferable. In a first example, the save and restore time is determined so as to be proportional to the number of bits in the latch circuit FF and the memory circuit SRAM in the logic circuit that are saving targets. For example, when the total number of bits in the saving target latch circuit FF in the logic circuit is denoted as Bf and the total number of bits in the saving target memory circuit SRAM in the logic circuit is denoted as Bs, the save and restore time is (wt+rt)*(Bf+Bs). In this case, the coefficient (wt+rt) is the total time of the save time (the time involved in read from the logic circuit and the time involved in write to the main memory) wt per bit and the restore time (the time involved in read from the main memory and the time involved in write to the logic circuit) rt per bit.

In a second example, the save and restore time is determined so as to be proportional to the number of accesses to the main memory during saving and restoration of the state data. In other words, the number of accesses during saving is equal to the total number of bits in the state data to be saved divided by the width of bits that can be written during one access to the main memory. On the other hand, the number of accesses during restoration is equal to the total number of bits in the state data to be restored divided by the width of bits that can be read during one access to the main memory. In both cases, the save and restore time depends on a packing rate at which the state data is packed in the single bit width of a single access to the main memory. When the number of accesses during saving is denoted as As and the number of accesses during restoration is denoted as Ar, the save and restore time is wt*As+rt*Ar.

FIG. 9 is a diagram illustrating an example of logic circuits and the save and restore time (S/R time) in a case where the fixed save and restore time is preset for each logic circuit. A table in FIG. 9 stores the IDs of the logic circuits configured in each partial reconfiguration area, the IDs of the configuration data CDATA for the logic circuits and the save and restore time (S/R time) for the logic circuits in association with the IDs of the logic circuits. The table in FIG. 9 is stored in the auxiliary storage device in FIG. 1 and expanded into the main memory when the server is activated. The table is then referenced by the CPU.

On the other hand, when the state data saved from and restored in the logic circuit varies significantly according to the state of the logic circuit, the save and restore time may be a variable time depending on the state of the logic circuit. In this case, the logic circuit is provided with a state machine that manages the current state of the logic circuit, and the number of bits Bfx in the latch circuit FF that needs saving and the number of bits Bsx in the memory circuit SRAM that needs saving are predetermined for each state x of the state machine. The save and restore time in the state x is expressed by (wt+rt)*(Bfx+Bsx). Alternatively, the save and restore time may be determined based on the number of accesses to the main memory described above in conjunction with the fixed values.

And, a register that constantly updates and stores the save and restore time depending on the state of the logic circuit indicated by the state machine is provided in the logic circuit so that the save and restore time is read from the register when task switching occurs. Alternatively, the state machine may contain a register that indicates the state of the logic circuit so that the state of the logic circuit is read from the register when task switching occurs, allowing the save and restore time to be calculated based on the state.

In FIG. 6, the state flip flop S_FF in the state machine 24 is a register indicating the state of the logic circuit (the state of the state machine controlling the state (STATE) of the logic circuit). In the example in FIG. 6, an output 34 from the state flip flop S_FF is input to a state FF value-time information conversion table 33, which then outputs the save and restore time corresponding to the state FF value.

FIG. 10 is a diagram illustrating an example of a state FF value-time information conversion table. The table in FIG. 10 indicates the save and restore time (S/R time) in each of states ST0 to ST4 that may be assumed by a logic circuit A and the save and restore time in each of states ST0 to ST2 that may be assumed by a logic circuit B.

An MPEG circuit is an example of a logic circuit for which the amount of data to be saved varies significantly according to the state of the logic circuit. For the MPEG circuit, timing for task switching at the time when picture processing is completed is significantly different from a timing for task switching during macro block processing. For example, at the time when the picture processing is completed, the saved data is a rate controlling variable in each a picture. On the other hand, during macro block processing, the saved data includes information in the picture (a rate controlling variable in the picture, adjacent-macro-block information, in-process macro block information, context information for entropy encoding) and has a large data amount.

Figure 11:
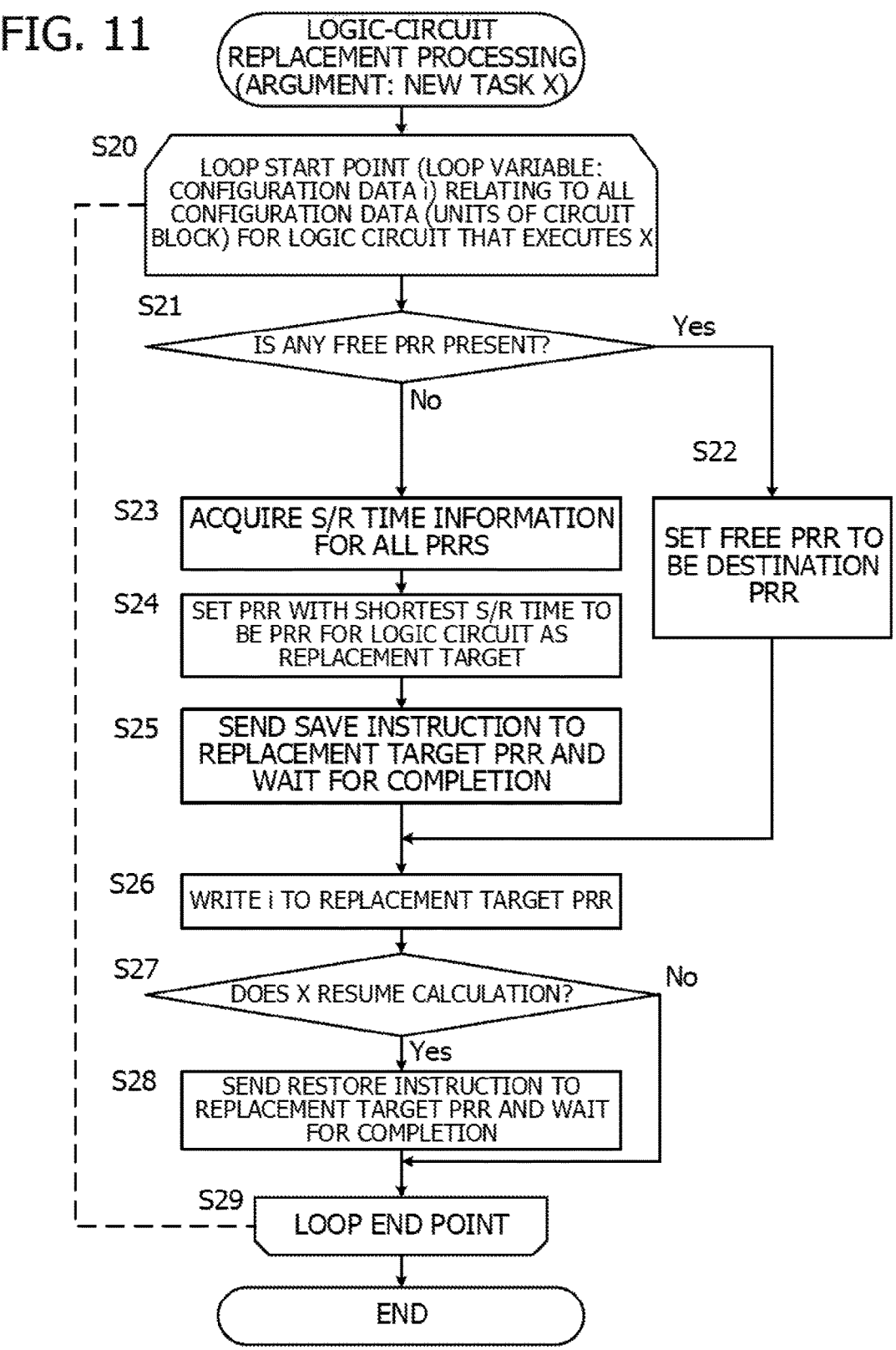
FIG. 11 is a flowchart illustrating a replacement process for a first logic circuit executed by the CPU according to the present embodiment.

FIG. 11 is a flowchart illustrating a replacement process for a first logic circuit executed by the CPU according to the present embodiment. The flowchart in FIG. 11 illustrates, in detail, steps S13 and S14 executed when switching from a certain task to a new task in FIG. 3 is detected (S10, YES) is detected and when the need arises to replace an old logic circuit configured in the PLD with a new logic circuit corresponding to the new task (S11 and S12, YES).

An argument of a program for a process of replacing the logic circuit is a replacement target task X. First, a loop S20 is a loop for the configuration data (a loop variable is configuration data i) of a logic circuit (circuit block) configured in one partial reconfiguration area PRR among a plurality of logic circuits that execute the replacement target task X. Therefore, when the logic circuit that executes the replacement target task X has logic circuits that are configured in N partial reconfiguration areas PRR, the loop variable is i=0 to N−1.

First, the CPU determines whether or not any free partial reconfiguration area PRR where no logic circuit is configured is present (S21). When a free PRR is present (S21, YES), the CPU sets the free PRR to be a destination to which configuration data for a new logic circuit is to be written (S22).

When no free PRR is present (S21, NO), the CPU selects a logic circuit as a replacement target (a logic circuit in the PRR). Specifically, the CPU acquires the save and restore time information (S/R time information) of all the PRRs (S23). In this acquisition process, when the S/R time is a fixed time depending on the logic circuit, the CPU acquires the information from the table for the S/R time corresponding to the logic circuit illustrated in FIG. 9. When the S/R time is a varying time depending on the state of the logic circuit, the CPU reads an output 35 from the state FF-time information conversion table shown in FIG. 6 or acquires a state number from the state flip flop S_FF in the state machine 24 in FIG. 6 to extract the S/R time corresponding to the state number for each logic circuit in FIG. 10.

The CPU then selects a logic circuit (or a partial reconfiguration area PRR) with the shortest S/R time to be a logic circuit (or a PRR) as a replacement target (S24). The CPU then sends a save instruction to save the state data in the logic circuit to the partial reconfiguration area PRR for the selected logic circuit, and waits for the saving to be completed (S25). Steps S24, S25 correspond to step S13 in FIG. 3.

Then, the CPU writes the configuration data i to the partial reconfiguration area PRR as a replacement target (S26). Since the configuration data is stored in the main memory, the CPU requests the PLD to read the corresponding configuration data i from the main memory and to write the configuration data i to an area in the configuration data memory CRAM of the PLD that corresponds to the replacement target PRR.

When the new task X resumes calculation (S27, YES), the CPU gives the PLD a restore instruction to restore the restored data in the main memory to the logic circuit in the replacement target PRR, and waits for the restoration to be completed (S28). When the new task X performs calculation for the first time (S27, NO), no data to be restored is present and the CPU avoids giving the restore instruction.

When the process is completed in which steps S21 to S28 described above are repeated for all of the configuration data i for the logic circuit needed to execute the new task X, the replacement process for the logic circuit is completed.

[Replacement Process (2) for the Logical Circuit]

Figure 12:
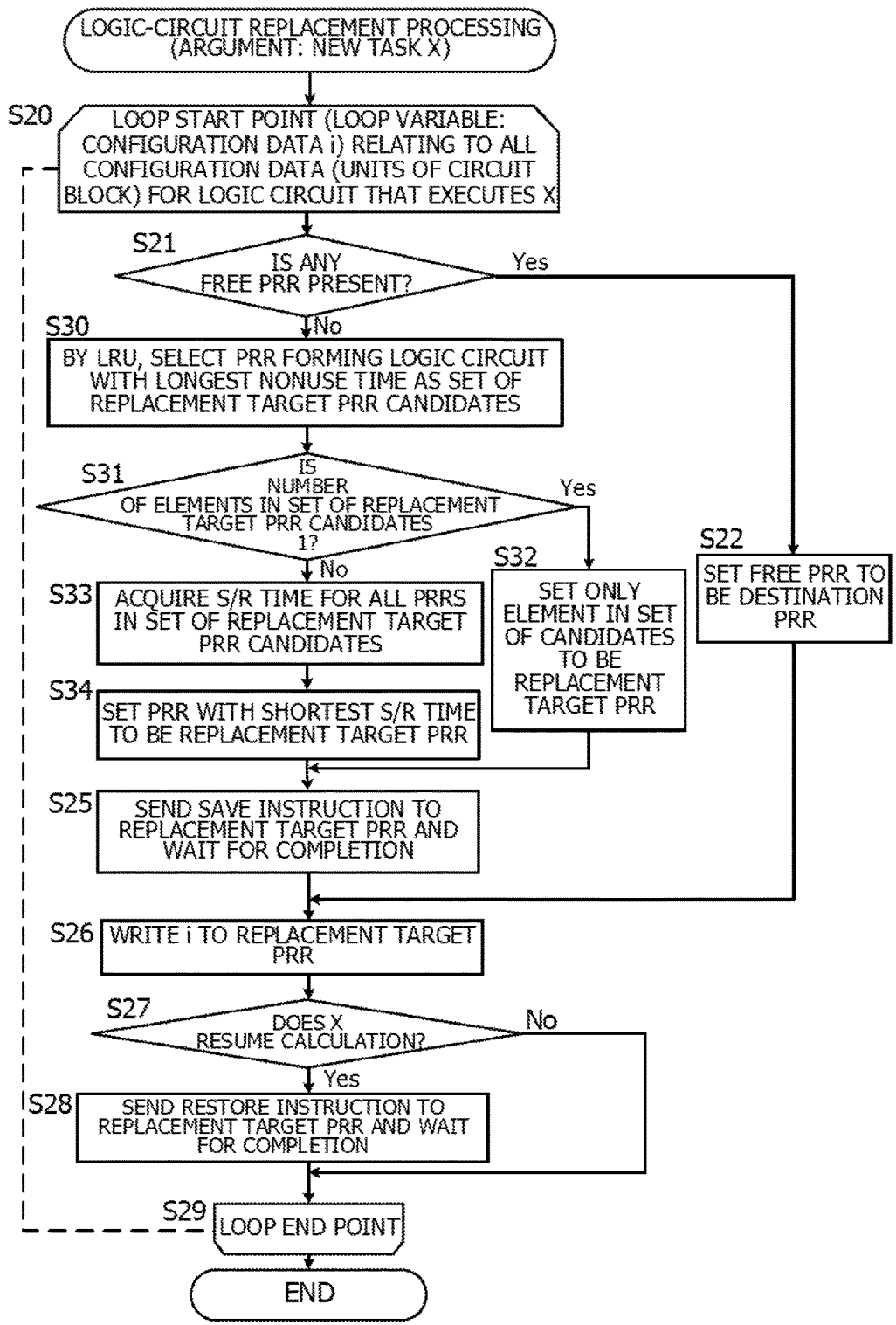
FIG. 12 is a flowchart illustrating a replacement process for a second logic circuit executed by the CPU in the present embodiment.

FIG. 12 is a flowchart illustrating a replacement process for a second logic circuit executed by the CPU in the present embodiment. In the replacement process for the second logic circuit, the logic circuit as a replacement target is selected taking into account the logic circuit nonuse time in addition to the save and restore time for the logic circuit. That is, the least recently used logic circuit (LRU logic circuit) in the PLD may be considered to have a low probability of being used in the future. Thus, such a logic circuit is determined to be a replacement target candidate. In other words, a selection algorithm is used which is based on least recent usage (LRU) and which is adopted for cache memories and the like. In the replacement process for the second logic circuit, from among a plurality of replacement target candidates selected based on LRU, a logic circuit that has the shortest save and restore time is selected as a restore target.

In the flowchart in FIG. 12, steps with the same step numbers as those in FIG. 11 represent the same process as that in FIG. 11. First, a loop S20 is the same as the loop S20 in FIG. 11.

In the loop S20, first, the CPU determines whether or not any free partial reconfiguration area PRR with no logic circuit configured therein is present (S21). When a free PRR is present (S21, YES), the CPU sets the free PRR to be a destination to which configuration data for a new logic circuit is to be written (S22).

When no free PRR is present (S21, NO), the CPU selects a logic circuit as a replacement target (a logic circuit in the PRR). In the second replacement process, a PRR forming a logic circuit with the longest nonuse time is selected according to LRU as an element of a set of replacement target PRR candidates (S30). When the set of replacement target PRR candidates has only one PRR (S31, YES), the PRR is selected as a replacement target PRR (S32).

Then, when the set of replacement target PRR candidates has a plurality of PRRs (S31, NO), the CPU acquires save and restore time information (S/R time information) for all the PRRs in the set of replacement target PRR candidates (S33). In this acquisition process, in a case of using a fixed time when the S/R time depends on the logic circuit, the CPU acquires the information from the S/R time table corresponding to the logic circuit in FIG. 9. When the S/R time is a varying time depending on the state of the logic circuit, the CPU reads the output 35 from the state FF-time information conversion table in FIG. 6 or acquires the state number from the state flip flop S_FF to extract the S/R time corresponding to the state number for each logic circuit in FIG. 10.

The CPU then selects a logic circuit (or a partial reconfiguration area PRR) in the set of replacement target candidates that has the shortest S/R time to be a logic circuit (or a PRR) as a replacement target (S34).

Subsequently, as is the case with FIG. 11, the CPU sends the save instruction to save the state data in the logic circuit to the partial reconfiguration area PRR for the selected logic circuit, and waits for the saving to be completed (S25). The CPU then writes the configuration data i to the partial reconfiguration area PRR as a replacement target (S26). When the new task X resumes calculation (S27, YES), the CPU gives the PLD the restore instruction to restore the restored data in the main memory to the logic circuit in the replacement target PRR, and waits for the restoration to be completed (S28).

FIG. 14 is a diagram illustrating an example of a PRR managing table managed by the CPU. In the second replacement process, candidates for the logic circuit as a replacement target is selected based on LRU. To achieve this, the CPU needs to store a history indicating the PRR for the logic circuit used.

A PRR managing table in FIG. 14 stores the IDs of configured logic circuits and a nonuse time for each of the logic circuits in association with all the PRRs in the PLD. The CPU sets the nonuse time to "0" when the operation of the logic circuit configured in the PRR is suspended, and increments the nonuse time for all the logic circuits whose operation being suspended each time a predetermined time elapses. In the example in FIG. 14, the nonuse time corresponds to 2 bit data and no longer increases upon reaching "3" (for 2 bit data, "11").

In general, the nonuse time for the replacement process based on LRU in a cache memory or the like is stored at a considerably low granularity in order to reduce the amount of stored data. For example, the nonuse time corresponds to 2 bit data and increases each time the predetermined time elapses. Thus, even when a PRR configuring a logic circuit with the longest nonuse time is extracted, many PRRs are extracted as replacement target candidates. Thus, a PRR configuring one of the replacement target candidates which has the shortest save and restore time is selected as a replacement target. This enables an increase in the efficiency of the replacement process for the logic circuit.

[Replacement Process (3) for the Logic Circuit]

Figure 13:
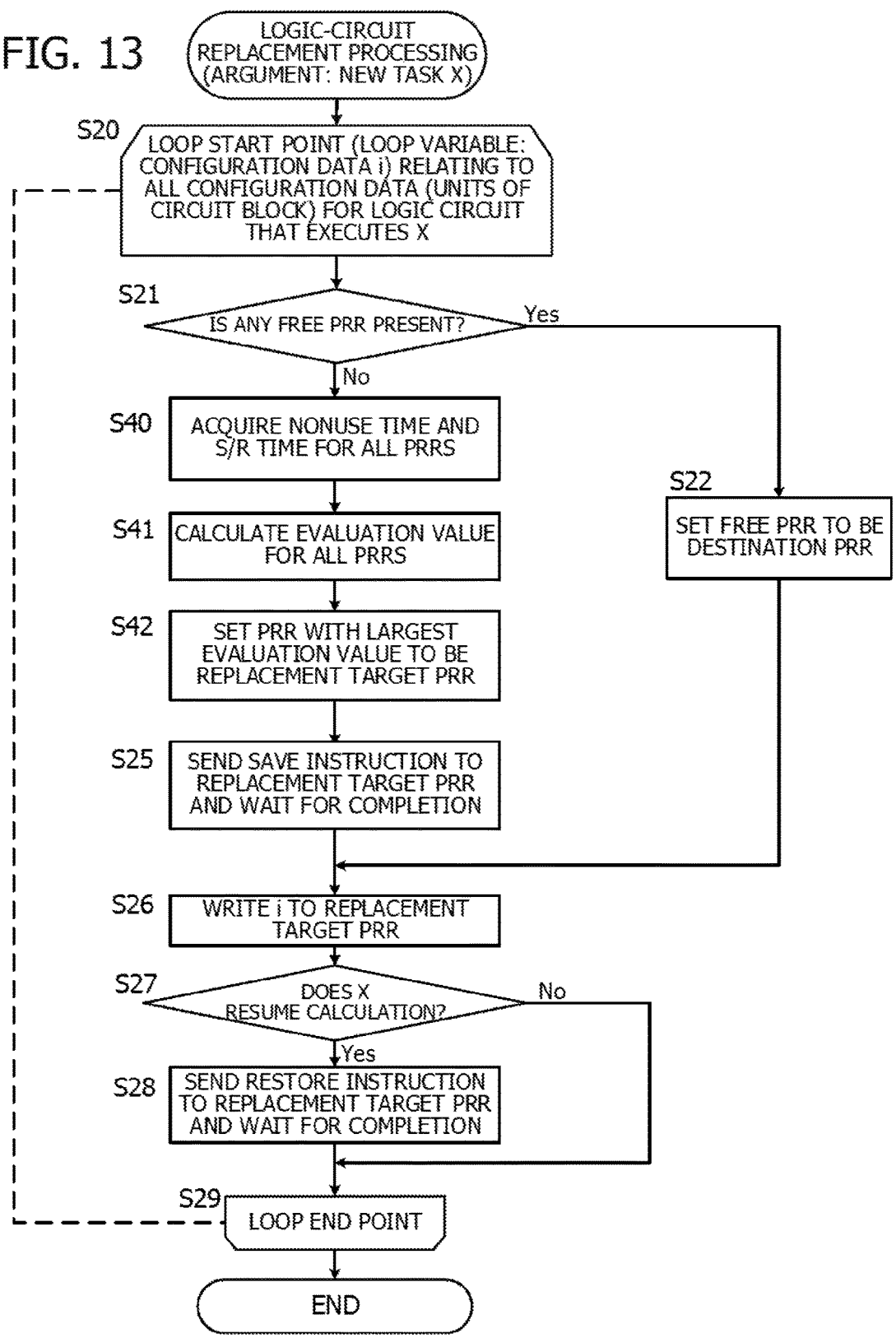
FIG. 13 is a flowchart illustrating a replacement process for a third logic circuit executed by the CPU in the present embodiment.

FIG. 13 is a flowchart illustrating a replacement process for a third logic circuit executed by the CPU in the present embodiment. Also in the replacement process for the third logic circuit, the logic circuit as a replacement target is selected taking into account the logic circuit unused time in addition to the save and restore time for the logic circuit. However, in the third replacement process, an evaluation value for the replacement target is calculated based on the nonuse time and the save and restore time, and a logic circuit with a larger evaluation value is preferentially selected as the replacement target.

In other words, a logic circuit with a longer nonuse time is more likely to be selected as a replacement target, and a logic circuit with a shorter save and restore time is more likely to be selected as a replacement target. An example of an equation that allows the evaluation value to be calculated is as follows.

$$\text{Evaluation value} = \text{nonuse time} - w \times \text{save and restore time}$$

In the equation, a weighted value for the save and restore time is denoted by w and determined based, for example, on the granularity or the maximum of the nonuse time or a comparison between the nonuse time and the save and restore time. The optimum weighted value is pre-determined preferably by experiments or the like.

In FIG. 13, steps with the same step numbers as those in FIG. 11 represent the same process as that in FIG. 11. First, a loop S20 is the same as the loop S20 in FIG. 11.

In the loop S20, first, the CPU determines whether or not any free partial reconfiguration area PRR with no logic circuit configured therein is present (S21). When a free PRR is present (S21, YES), the CPU sets the free PRR to be a destination to which configuration data for a new logic circuit is to be written (S22).

When no free PRR is present (S21, NO), the CPU acquires the save and restore time and the nonuse time of each of the logic circuits in all the PRRs (S40). The save and restore time is acquired from the table in FIG. 9, same as the case with the processing in S23 described for FIG. 11. The nonuse time is acquired from the table in FIG. 14.

Then, the CPU calculates the evaluation value for each of the logic circuits in all the PRRs based on the acquired nonuse time and save and restore time using the above-described equation (S41), and selects a PRR for a logic circuit with the largest evaluation value, as the replacement target PRR (S42).

Subsequent steps S25 to S28 are similar to steps S25 to S28 in FIG. 11 and FIG. 12.

[Replacement Process (4) for the Logic Circuit]

In the first to third replacement processes, a logic circuit with a shorter save and restore time is preferentially selected to be a logic circuit as a replacement target. In contrast, in fourth replacement process, a logic circuit with a shorter replacement time is preferentially selected to be a logic circuit as a replacement target; the replacement time is calculated based on the save and restore time and the write time for the configuration data. The replacement time is calculated, for example, as follows.

Replacement time=save and restore time+w2×write time for configuration data

In the equation, a weighted value for the write time for the configuration data is denoted by w2.

In the selection of a logic circuit as a replacement target in the first to third replacement processes, the save and restore time is replaced with the replacement time. Then, in consideration of the total time needed to drive a configured logic circuit out of the PRR and to back the same into the PRR, a logic circuit with the shortest time needed to drive the logic circuit out of the PRR and to back the same into the PRR can be selected to be a logic circuit as a replacement target. When the write time for the configuration data is unignorably long, the fourth replacement process is effective.

[Specific Examples of the Replacement Process for the Logic Circuit]

FIG. 15 is a table illustrating a specific example of the first to third replacement processes for the logic circuit. FIG. 15 indicates the nonuse time, the S/R time, and the evaluation value for each of the four partial reconfiguration areas PRR, and a logic block as a replacement target in each of a case where a logic circuit with the longest nonuse time is selected as a replacement target, a case where a logic circuit with the shortest S/R time is selected based on L (first replacement process), a case where a logic circuit with the shortest S/R time is selected from candidates with the longest nonuse time (second replacement process), and a case where a logic circuit with the largest evaluation value is selected (third replacement process). The nonuse time and the S/R time are the same as those in the specific examples in FIG. 9 and FIG. 14.

When a logic circuit with the longest nonuse time is selected based on LRU, PRRs in which logic circuits A, B are configured are selected as replacement targets. In contrast, when logic circuit with the shortest S/R time is selected (first replacement process), a PRR in which a logic circuit C is configured is selected as a replacement target. When a logic circuit with the largest evaluation value is selected (third replacement process), the PRR in which the logic circuit C is configured is selected as a replacement target. The logic circuit C has a nonuse time of "1", which is not so long, but has an S/R time of "1", which is shorter than the other logic circuits A, B, and is thus selected as a replacement target in the first and third replacement processes.

As described above, when a logic circuit with a shorter S/R time is preferentially selected as a replacement target, the probability that a logic circuit with a shorter S/R time is selected is higher than the probability that a logic circuit selected based on LRU is selected.

As described above, according to the present embodiment, when various logic circuits are independently configured and operate independently in a plurality of partial reconfiguration areas in the PLD, if the number or size of free partial reconfiguration areas in which a new logic circuit is to be configured is insufficient, a logic circuit with a shorter time involved in saving and restoration of the state data is preferentially selected as a replacement target. This enables an increase in the efficiency of the replacement process for the logic circuits configured in the PLD.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium that stores therein a programmable logic device (hereinafter referred to as a PLD) control program for causing a computer to execute process comprising:
   determining whether or not a second logic circuit needs to be configured in any of a plurality of reconfiguration areas where logic circuits are enabled to be reconfigured in the PLD;
   selecting, when the second logic circuit needs to be configured in any of the plurality of reconfiguration areas, and when a total size or number of a plurality of first logic circuits already configured in the plurality of reconfiguration areas and the second logic circuit exceeds a size or a number of logic circuits that are enabled to be configured in the plurality of reconfiguration areas, a replace target logic circuit to be replaced with the second logic circuit, as a replacement target, from among the plurality of first logic circuits, based on save and restore time needed to save and restore state data of each of the plurality of first logic circuits;
   outputting, to the PLD, a save request to save state data of the replace target logic circuit;
   outputting, to the PLD, a configuration request for configuring the second logic circuit in a replace target area where the replace target logic circuit has been configured, by writing configuration data for configuring the second logic circuit in a configuration memory corresponding to the replace target area;
   outputting, to the PLD, when the second logic circuit resumes operation, a restore request to restore saved state data of the second logic circuit in the second logic circuit that is configured; and
   outputting, to the PLD, a start request to start operation of the second logic circuit that is configured.

2. The non-transitory computer-readable storage medium that stores therein the PLD control program according to claim 1, wherein the process further comprises:
outputting, to the PLD, a configuration request for configuring the second logic circuit in an empty area in the plurality of reconfiguration areas where no logic circuit has been configured, by writing configuration data for configuring the second logic circuit in a configuration memory corresponding to the empty area, when the total size or number of the plurality of first logic circuits already configured in the plurality of reconfiguration areas and the second logic circuit does not exceed the size or the number of logic circuits that are enabled to be configured in the plurality of reconfiguration areas.

3. The non-transitory computer-readable storage medium that stores therein the PLD control program according to claim 1, wherein the selecting includes preferentially selecting any of the plurality of first logic circuits, for which the save and restore time is shorter, to be the replace target logic circuit.

4. The non-transitory computer-readable storage medium that stores therein the PLD control program according to claim 3, wherein the selecting includes preferentially selecting, from among the plurality of first logic circuits each having a longest nonuse time, any of the plurality of first logic circuits that has a shorter save and restore time, as the replace target logic circuit.

5. The non-transitory computer-readable storage medium that stores therein the PLD control program according to claim 3, wherein the selecting includes preferentially selecting, as the replace target logic circuit, any of the plurality of first logic circuits that has a larger evaluation value resulting from subtracting from a nonuse time a value obtained by multiplying the save and restore time by a predetermined weighted value.

6. The non-transitory computer-readable storage medium that stores therein the PLD control program according to claim 1, wherein the save and restore time is a fixed time that is predetermined for each of the plurality of first logic circuits.

7. The non-transitory computer-readable storage medium that stores therein the PLD control program according to claim 1, wherein the save and restore time is a varying time that varies according to an operating state of each of the plurality of first logic circuits.

8. The non-transitory computer-readable storage medium that stores therein the PLD control program according to claim 1, wherein the plurality of reconfiguration areas in which the logic circuits are enabled to be reconfigured in the PLD is a plurality of reconfiguration areas into which a reconfigurable area in the PLD is logically segmented.

9. The non-transitory computer-readable storage medium that stores therein the PLD control program according to claim 1, wherein the plurality of reconfiguration areas in which the logic circuits are enabled to be reconfigured in the PLD is a plurality of reconfiguration areas into which a reconfigurable area in the PLD is physically segmented.

10. A method for controlling a programmable logic device (hereinafter referred to a PLD) comprising:
determining whether or not a second logic circuit needs to be configured in any of a plurality of reconfiguration areas where logic circuits are enabled to be reconfigured in the PLD;
selecting, when the second logic circuit needs to be configured in any of the plurality of reconfiguration areas, and when a total size or number of a plurality of first logic circuits already configured in the plurality of reconfiguration areas and the second logic circuit exceeds a size or a number of logic circuits that are enabled to be configured in the plurality of reconfiguration areas, a replace target logic circuit to be replaced with the second logic circuit, as a replacement target, from among the plurality of first logic circuits, based on save and restore time needed to save and restore state data of each of the plurality of first logic circuits;
outputting, to the PLD, a save request to save state data of the replace target logic circuit;
outputting, to the PLD, a configuration request for configuring the second logic circuit in a replace target area where the replace target logic circuit has been configured, by writing configuration data for configuring the second logic circuit in a configuration memory corresponding to the replace target area;
outputting, to the PLD, when the second logic circuit resumes operation, a restore request to restore saved state data of the second logic circuit in the second logic circuit that is configured; and
outputting, to the PLD, a start request to start operation of the second logic circuit that is configured.

11. An information processing device comprising:
a programmable logic device (hereinafter referred to a PLD) that has a plurality of reconfiguration areas where logic circuits are enabled to be reconfigured, a logic circuit being able to be reconfigured in each of the plurality of reconfiguration areas;
an processor that
determines whether or not a second logic circuit needs to be configured in any of the plurality of reconfiguration areas; and
selects, when the second logic circuit needs to be configured in any of the plurality of reconfiguration areas, and when a total size or number of a plurality of first logic circuits already configured in the plurality of reconfiguration areas and the second logic circuit exceeds a size or a number of logic circuits that are enabled to be configured in the plurality of reconfiguration areas, a replace target logic circuit to be replaced with the second logic circuit, as a replacement target, from among the plurality of first logic circuits, based on save and restore time needed to save and restore state data of each of the plurality of first logic circuits;
output, to the PLD, a save request to save state data of the replace target logic circuit;
output, to the PLD, a configuration request for configuring the second logic circuit in a replace target area where the replace target logic circuit has been configured, by writing configuration data for configuring the second logic circuit in a configuration memory corresponding to the replace target area;
output, to the PLD, when the second logic circuit resumes operation, a restore request to restore saved state data of the second logic circuit in the second logic circuit that is configured; and
output, to the PLD, a start request to start operation of the second logic circuit that is configured.

12. The information processing device according to claim 11, wherein the processor preferentially selects any of the plurality of first logic circuits, for which the save and restore time is shorter, to be the replace target logic circuit.

13. The information processing device according to claim 11, wherein a logic circuit block being able to be configured in each of the plurality of reconfiguration areas is reconfigured in each of the plurality of reconfiguration areas.

* * * * *